United States Patent [19]

Brunberg et al.

[11] 4,205,531
[45] Jun. 3, 1980

[54] METHOD IN THE COOLING OF A SPACE AND APPARATUS FOR CARRYING OUT SAID METHOD

[76] Inventors: Ernst-Åke Brunberg, 34, Frejavägen, Djursholm, Sweden, S-182 64; Ray Olsson, 27, Boforsgatan, Farsta, Sweden, S-123 44

[21] Appl. No.: 908,271

[22] Filed: May 22, 1978

[30] Foreign Application Priority Data

May 31, 1977 [SE] Sweden .............................. 7706357

[51] Int. Cl.² ........................ F25B 15/00; F25B 17/00; F25B 17/08
[52] U.S. Cl. ........................................ 62/101; 62/106; 62/477; 62/480
[58] Field of Search ................ 62/100, 101, 106, 112, 62/119, 476, 480; 165/2, 105

[56] References Cited

U.S. PATENT DOCUMENTS

| | | | |
|---|---|---|---|
| 1,729,081 | 9/1929 | Miller | 62/106 |
| 1,729,083 | 9/1929 | Miller et al. | 62/106 |
| 2,053,683 | 9/1936 | Schlumbohm | 62/106 |
| 2,144,441 | 1/1939 | Schlumbohm | 62/106 |
| 3,270,512 | 9/1966 | Webb | 62/477 |
| 3,642,059 | 2/1972 | Greiner | 62/476 |
| 4,048,810 | 9/1977 | Zeilon | 62/101 |
| 4,126,016 | 11/1978 | Greiner | 62/480 |

*Primary Examiner*—Lloyd L. King

*Attorney, Agent, or Firm*—Hubbell, Cohen, Stiefel & Gross

[57] ABSTRACT

A space is cooled by gasifying or vaporizing a first, preferably liquid substance in a first container located in said space. The gas or vapor thus formed is conducted into a second container located outside the space and containing a second substance generating a lower gas pressure than said first substance at the same temperature, preferably by being chemically bound thereby. Said gas or vapor is absorbed by the second substance, which shall possess the quality of forming a porous, substantially rigid body in its container after heating or regeneration in vacuum. The second substance is comprised of sodium sulphide, at least as its major ingredient.

Additionally an apparatus for carrying out this method comprises a first container which contains a gasifiable or vaporizable substance and is located in a space to be cooled, at least one second container which is located outside this space, and conduits which comprise a shut off valve and connect said first container with said second container which contains a second substance, which generates a lower gas pressure than said first substance at the same temperature and has the ability of absorbing gas emitted or generated by said first substance. The second substance is comprised of sodium sulphide, at least as its major ingredient.

12 Claims, 7 Drawing Figures

METHOD IN THE COOLING OF A SPACE AND APPARATUS FOR CARRYING OUT SAID METHOD

BACKGROUND OF THE INVENTION

1. Field of the Invention

The invention relates to a method of cooling of a space and to an apparatus for carrying out this method. According to this method a first substance is gasified or vaporized in a first container located in said space, and the gas or vapor thus formed is conducted into a second container located outside said space and containing a second substance generating a lower gas pressure than said first substance at the same temperature, said gas or vapor being caused to be absorbed by said second substance in said second container.

The apparatus for carrying out this method comprises a first container which contains a gasifiable or vaporizable substance and is located in a space to be cooled, at least one second container which is located outside this space, and conduits which comprise a shut off valve and connect said first container with said second container, which contains a second substance, which generates a lower gas pressure than said first substance at the same temperature and has the ability of absorbing gas emitted or generated by said first substance.

The invention is based upon the fact that certain substances absorb gases or vapors chemically, e.g. by binding water of crystallization. During this absorption heat energy is freed in the substance. This heat energy has two sources first chemical energy of the substance and second the heat of vapor absorption which is freed when the chemically active gas or vapor is absorbed by the substance. The substance is enclosed in a container which is connected through a suitable conduit with a second container, which in its turn contains a second substance or liquid, from which the gas is freed, which is absorbed by the substance in the first container. When the gas or vapor is formed in the second container, heat energy (heats of vaporization) is absorbed therefrom and from its surrounding atmosphere, which is accordingly cooled. In the case when the second container contains a substance which contains a chemically bound liquid in its low-energy condition and which releases gas, which is absorbed by the first substance, there is required, in addition to heats of vaporization, release energy for the releasing of the chemically bound liquid.

2. Description of the Prior Art

A process and an apparatus which is based upon this principle is disclosed in the U.S. Pat. No. 3,642,059 to Greiner and comprises two vessels interconnected by a conduit, the first containing a vaporizable liquid, e.g. water, and the second containing vapor-absorptive chemical, e.g. $Na_2O$. Liquid is vaporized from the first vessel and the vapors are drawn by the vapor-absorptive chemical through the conduit to the second vessel where they are absorbed and condensed. The consequence hereof is that the first vessel is cooled through heats of vaporization and that the second vessel is heated through heats of vapor absorption.

As far as we are aware no apparatus according to this patent has been built. The main reason for that probably resides in the fact that the inventor has neglected to take the importance of the residual gases in the apparatus into consideration. The partial pressure of these gases has to be much lower than the pressure of water vapor at the actual equilibrium and not "lower than the atmospheric". This statement means that the supply of liquid (water) to the Greiner apparatus continuously introduces gases dissolved in the water, and these gases arrest the process.

Furthermore, none of the chemicals proposed by Greiner has the majority of such physical and chemical properties as are essential for an operative apparatus. The most important of these properties are (1) high exchange of energy, counted per unit of weight and volume of substance at one and the same phase transition; (2) unchanged (solid) state of aggregation in charged as well as in discharged condition; (3) minimal change of volume at the absorption of gas or vapor; (4) large maintained active surface of reaction throughout the whole process; and (5) unlimited number of charging and discharging (cooling) operations in one and the same container.

SUMMARY OF THE INVENTION

The principal object of the invention is to provide improved methods and operable apparatus of the above-mentioned kind which are capable of producing a very great cooling effect—counted in absolute measure as well as per unit of weight of active substances—which are very easy to regenerate.

With this object in view a substance, which forms a porous, substantially rigid body in its container after heating or regeneration in vacuum, is selected as said second substance.

In the preferred embodiment of the invention said second substance comprises sodium sulphide, at least as its major ingredient. This chemical meets all the above-mentioned requirements and has the additional advantage that regeneration thereof can be carried out at a low temperature (below 100° C.), which means that e.g. solar energy or waste heat can be utilized for the regeneration. Of particular importance is also its ability to sinter or bake into a porous, puniceous body which maintains its function, ability and shape during repeated charging and discharging operations.

Further features and advantages of the process and the apparatus according to the invention will become apparent from the following detailed description and the annexed drawings which diagrammatically and as non-limiting examples illustrate some embodiments of the invention and in which same reference characters have been used throughout to designate the same or similar components.

BRIEF DESCRIPTION OF THE DRAWINGS

FIG. 6 is a vertical longitudinal sectional view of a modification of the apparatus according to FIG. 5.

FIG. 7 is a horizontal sectional view substantially on line VII—VII in FIG. 6.

DESCRIPTION OF THE PREFERRED EMBODIMENTS

Figure 1:
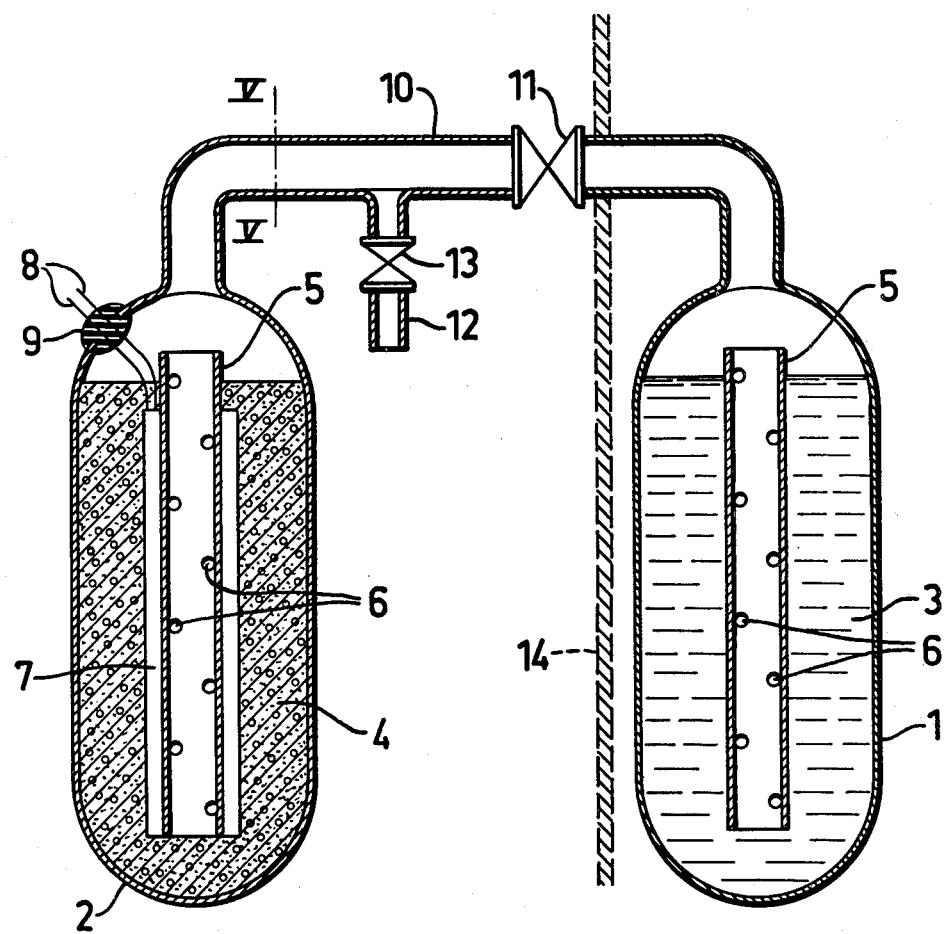
FIG. 1 is a vertical sectional view basically illustrating the principal members of a cooling apparatus according to the invention.

In FIG. 1, 1 is a container or vessel which contains a first substance (liquid) 3 and constitutes the cooling element e.g. of a refrigerator or in a cooling or refrigerator bag or box. In the embodiment described below the substance 3 is water. 2 is a second vessel or container containing a second substance 4, especially $Na_2S$ or a substance having $Na_2S$ as its major constituent, which has the ability of binding chemically, absorbing and/or taking up in another way gas from the first substance 3. As is apparent from the above, said first substance may either be vaporized in its entirety or may be a substance, e.g. a hydrate, from which gas can be driven out. Accordingly, the substance 4 has at least one state or condition of lower energy, in which it has absorbed a greater or smaller quantity of gas or vapor from the first substance 3, and at least one high-energy condition, in which it is more or less free from gas from the substance 3 (i.e. "regenerated").

According to the invention said other substance 4 is preferably $Na_2S$ or at least a substance which contains $Na_2S$ as its major ingredient. Each container 1, 2 contains a tube 5 having apertures 6 in its wall. In the container 2 said tube is preferably surrounded by an electric heater 7 for regenerating the substance 4. By means of a cable 8, which passes through an insulating and vacuum tight bushing 9 in the wall of the container 2, the element 7 may be connected to a suitable voltage source, e.g. a 220 V mains socket or a 12 V car battery.

The containers 1 and 2 which may be provided with cooling flanges or fins (not shown) are interconnected by means of a conduit 10, which comprises a shut off valve 11. Between this valve and the second container 2 the conduit 10 is provided with a branch conduit 12 which comprises a shut off valve 13 and by means of which the two containers 1, 2 may be connected to a vacuum pump (not shown). It is presupposed that the two containers are isolated from each other by means of a heat insulating wall 14

It is further presupposed that the partial pressure in the containers 1 and 2 of other gases or vapors than that which is taken up or absorbed by the sodium sulphide 4 is much lower than the gas pressure of sodium sulphide. This is brought about by means of a vacuum pump which is connected to the conduit 12 and is started after that the valves 11 and 13 have been opened. When a suitable vacuum has been attained, valve 13 is closed. In the initial condition in the selected example when valve 11 is closed, the container 1 thus contains water and the container 2 contains $Na_2S$ in its high-energy condition in which it is at least substantially freed of water of crystallization. When valve 11 is opened, water in the container 1 vaporizes and flows in the form of water vapor to the container 2 in which it is absorbed by the sodium sulphide 4 which accordingly becomes enriched in water of crystallization. The production of gas (vaporization of water) during which heat energy is dissipated from the container 1 and its surrounding atmosphere, which is accordingly cooled, and the absorption of water vapor by the sodium sulphide, which is a chemical reaction, thus take place in different containers or vessels inside and outside the space to be cooled, respectively. Accordingly, the system operates as a heat pump in which the substance 3 pumps heat energy from the container 1 to the container 2. As a result a substantially greater cooling effect is attained—measured per unit of weight of substance and liquid as well as in an absolute measure—than at a mere mixing of substances (so called cooling mixtures) and at earlier gas-absorptive substances utilized for the same purpose. A further advantage of the system resides therein that it can easily be regenerated. The chemical process is namely reversible and takes place in the opposite direction, when heat energy is supplied to the "discharged" sodium sulphide 4 at an elevated temperature, suitably by electric heating by the element 7, at the same time as the container 1 is cooled to a suitable, low temperature. The temperatures in the containers 1 and 2 at regeneration should be selected in such a way that the gas pressure above the sodium sulphide 4 in the container 2 is higher than the gas pressure in the container 1.

As is evident from the above, the substance in the container or module 2 is preferably comprised of sodium sulphide, either in the form of a powder or moulded. In the latter case aqueous sodium sulphide (e.g. $Na_2S.4,5.H_2O$), having a fusing point of about 90° C. is melted and poured into the container or module 2, such measures having been taken that one or more channels corresponding to the tubes 5 are formed for subsequent facilitating of the gas transport to and from the substance in the operating system. Powdered or granular (instead of melted) sodium sulphide may also be supplied to or poured into the container 2. At the regeneration (heating) in vacuum of sodium sulphide introduced in its powdered state water vaporizes or dissipates, whereby a comparatively hard and substantially rigid but nevertheless porous body is obtained, which has better heat conducting properties than the initially supplied, powderous sodium sulphide.

The method and the apparatus according to the invention are intended e.g. for smaller, mobile cooling appliances e.g. for the storage of food in recreation vessels, cars, camping waggons or house trailers and so on.

Figure 2:
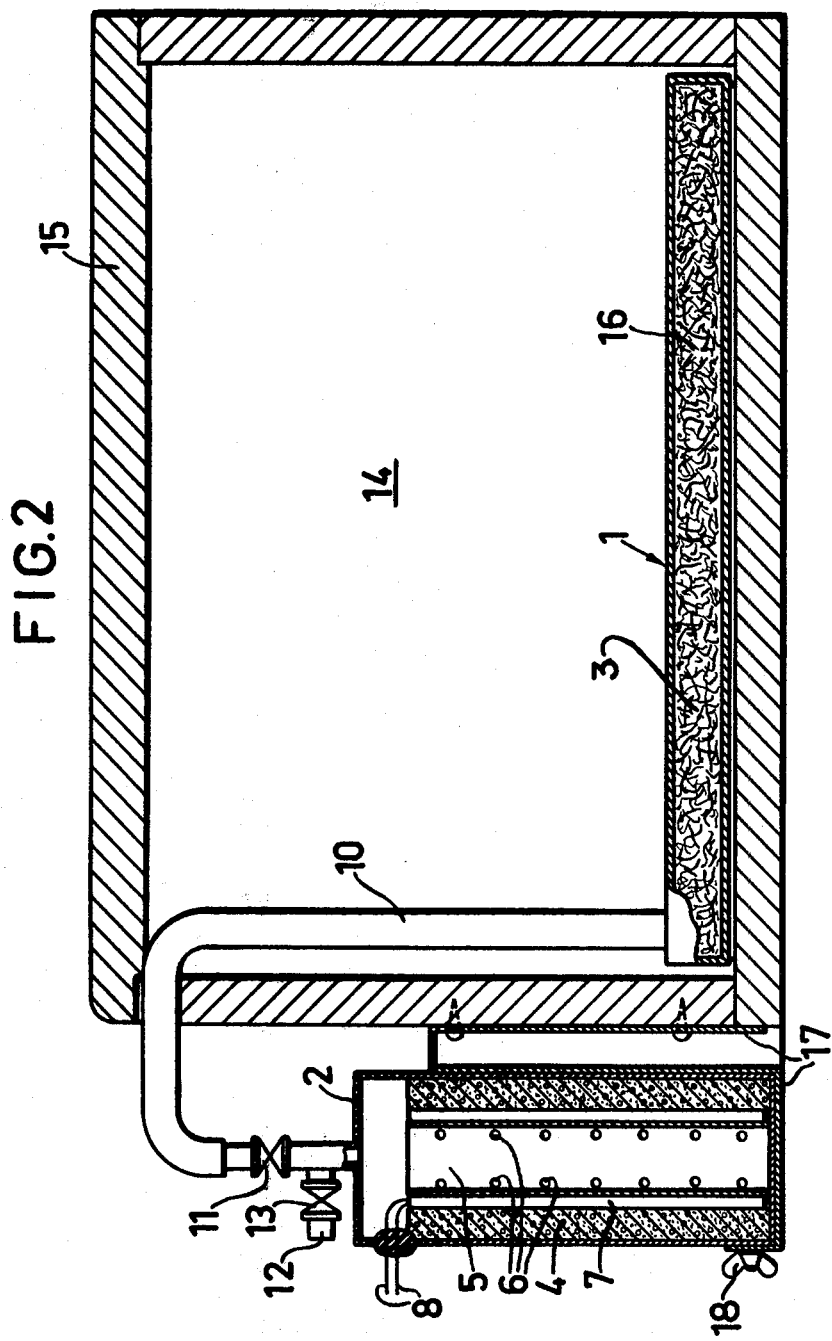
FIG. 2 is a diagrammatical longitudinal sectional view through a cooling or refrigerator bag or box, to which the invention may be applied.
Figure 3:
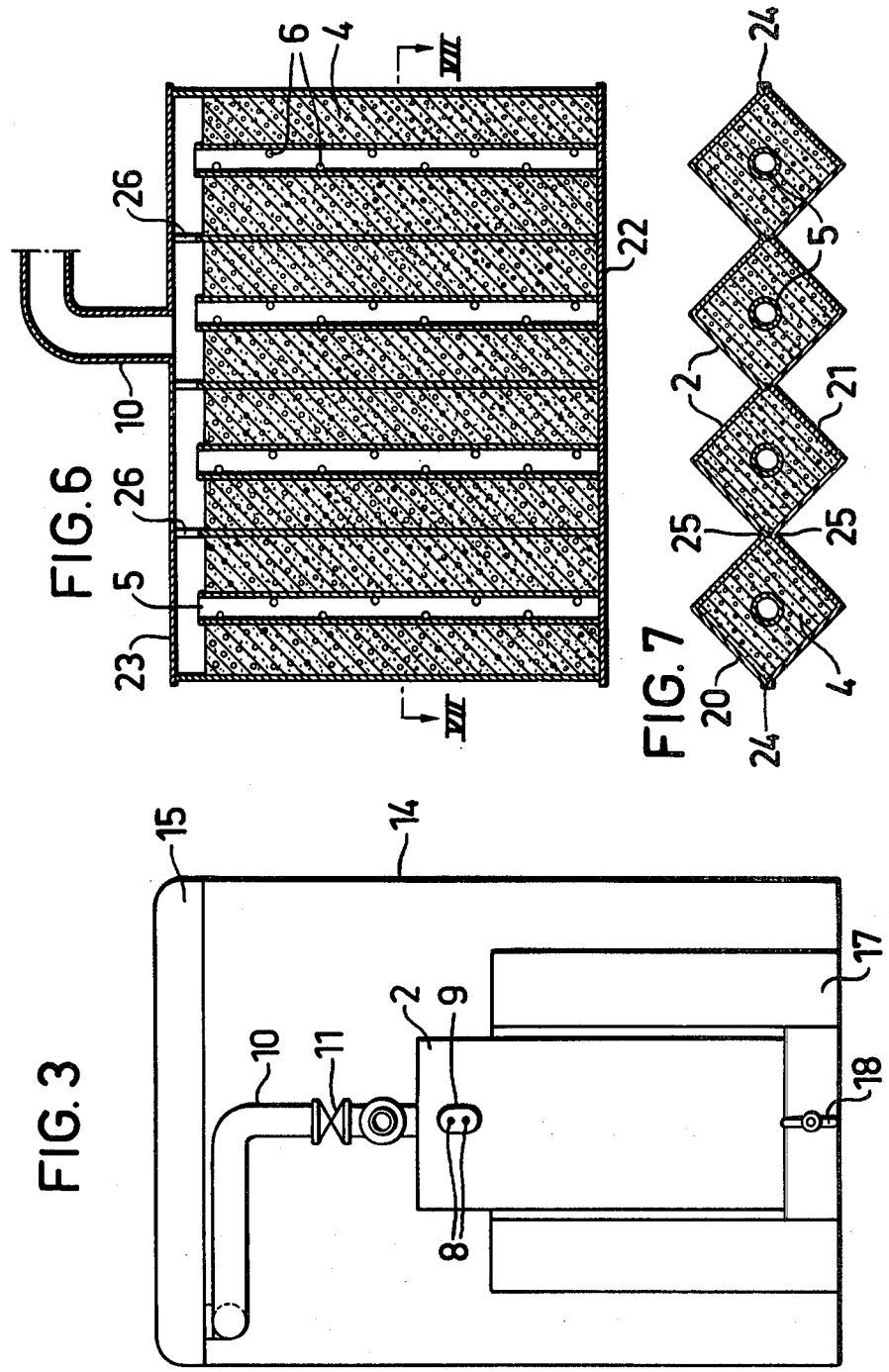
FIG. 3 is a side elevation of the cooling bag according to FIG. 2, as seen from the left.

FIGS. 2 and 3 in which the same reference numerals as in FIG. 1 are utilized to designate the same or similar components, illustrate in longitudinal section and a side view from the left in FIG. 2, respectively, a cooling bag or box, to which the invention has been applied.

The cooling bag comprises a box part 14 and a removable cover 15. The container 1 has the shape of a flat box which is located on the bottom of the cooling bag and comprises preferably—in the case when the substance 3 is water or another liquid—a porous substance 16 in which the substance 3 is absorbed. The container 2 containing the sodium sulphide is secured to the box part 14 by means of a plate or the like 17, to which it is attached by means of a wing screw 18 or the like.

Figure 4:
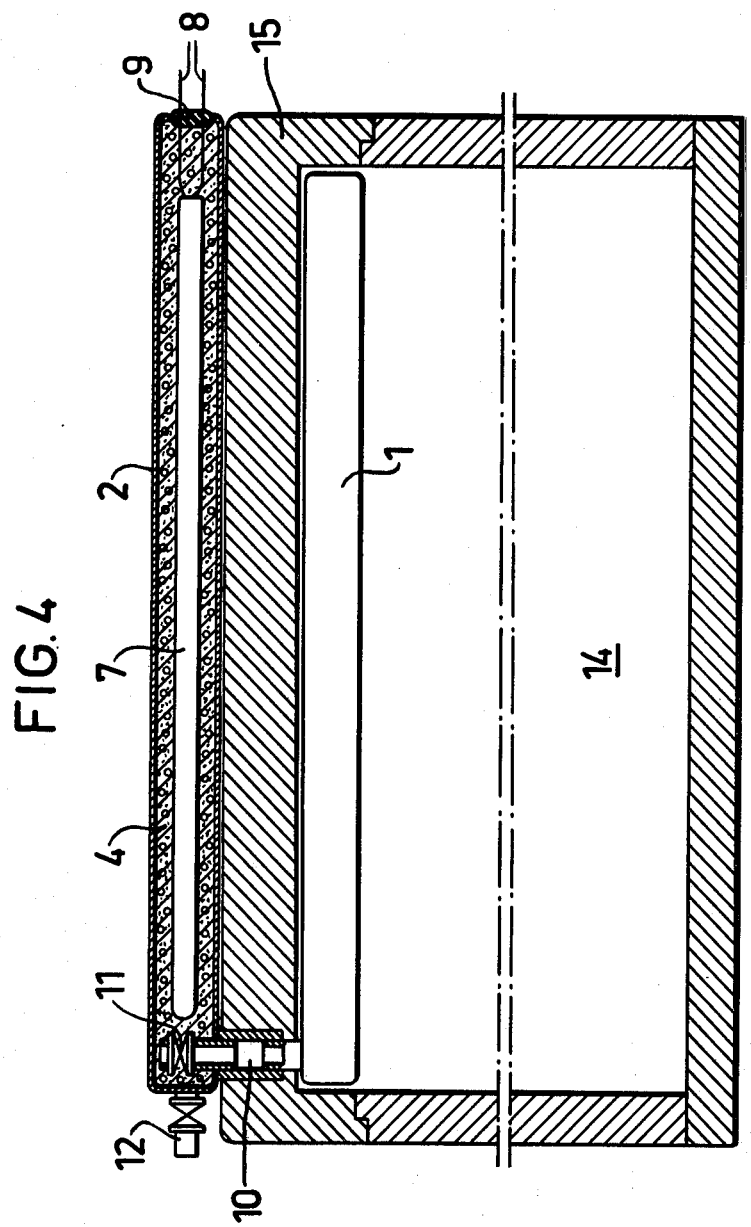
FIG. 4 illustrates a modification of the cooling bag according to FIGS. 2 and 3 in a diagrammatical longitudinal sectional view.

An alternative embodiment of the cooling bag according to FIGS. 2 and 3 is diagrammatically illustrated in longitudinal section in FIG. 4, in which the same reference characters as in FIGS. 2 and 3 have been utilized for the same or like components and according to which the container 1, i.e. the cooling element, as well as the container 2, i.e. the heat dissipating element, are mounted on the cover 15 of the cooling box under the cover and upon the cover, respectively. The valve 11 in the conduit 10 between the two containers 1 and 2 may be omitted, if the cooling box is adapted to be utilized immediately after the regeneration of the chemical in the container 2.

Figure 5:
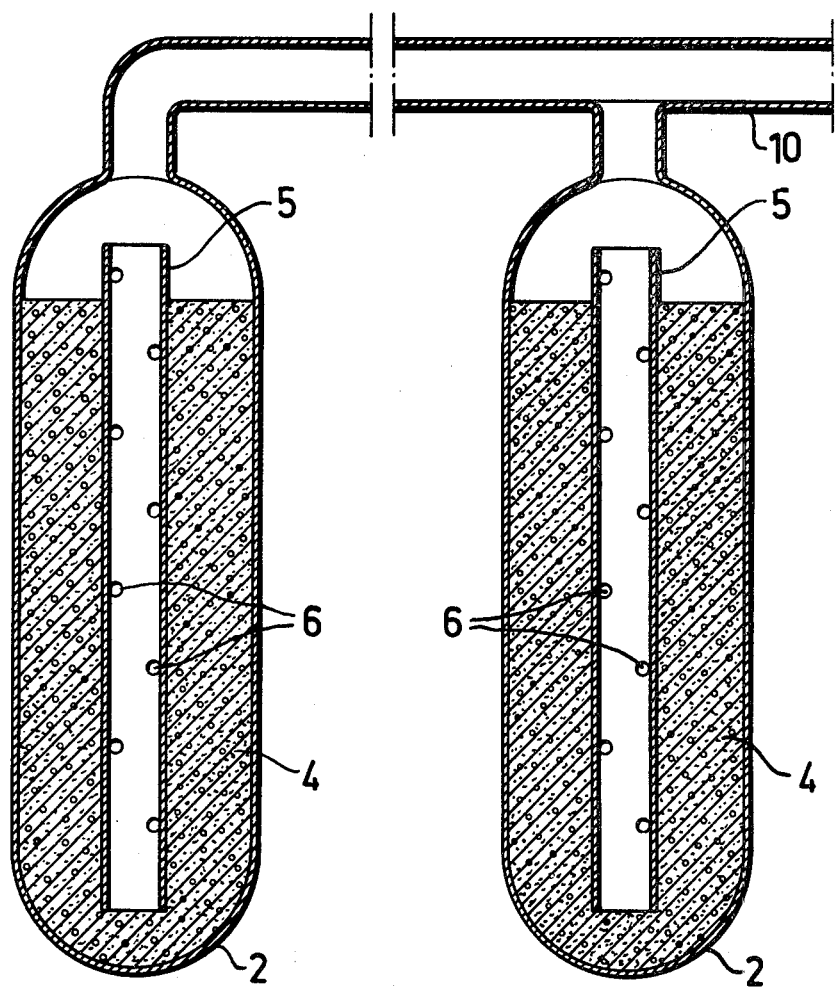
FIG. 5 is a diagrammatical vertical sectional view of the portion of the cooling apparatus according to the invention which is located to the left of the line V—V in FIG. 1.

For larger systems, such as refrigerating chambers or cooled-storage rooms, a paralleling of several containers 2, basically according to FIG. 5 which illustrates a first modification of that portion of FIG. 1 which is located to the left of line V—V, constitutes a practical solution. A corresponding embodiment is illustrated as example in FIGS. 6 and 7 which illustrate a second modification of said portion of FIG. 1 and in which the electric heater 7 is not included. Each container 2 or module then comprises part of a heat battery, which is also well suited for the utilization in a heat storage system according to our Swedish patent application 761.465.39. The containers or modules 2 do not necessarily have to be entirely individual units but may e.g. be made contiguous as is apparent from FIGS. 6 and 7 which disclose a unit comprised of four modules 2. This unit comprises two mutually identical, zig-zag-bent wall plates 20 and 21, a bottom plate 22 and an upper plate 23 from which the tube 10 emerges. The wall plates 20 and 21 are in vacuum-tight relationship with the bottom plate 22 and the upper plate 23 and also to each other at their outer vertical end edges 24. The wall plates 20, 21 are spot-welded to each other at their adjoining or abutting folding lines 25 and are consequently substantially isolated from each other except within the upper region, near the upper plate 23, where the wall plates 20, 21 are thinned or bent out from each other to a small extent for forming slots or passages 26 through which all modules 2 are in connection with the conduit 10.

Several different embodiments of the cooling system may be feasible:

1. An entirely or partly closed system which may be regenerated e.g. by electric heating, solar energy or low-temperature heat energy, such as waste heat, and is only provided with the valve 11.

2. A system in which a charged container (containing sodium sulphide or the like in its high-energy condition) is substituted for a discharged container 2 and new liquid is supplied to the container 1. A vacuum pump is necessary when changing containers.

3. A system 1-10-2 which is replaceable as one unit and may either be deposited for regeneration in exchange for a regenerated system, or may be discarded.

The embodiments described above and shown in the drawings are of course to be regarded merely as non-limiting examples and may as to their details be modified in several ways within the scope of the following claims. Thus, the cooling box according to FIGS. 2-3 or FIG. 4 may be provided with a pair of wheels at its one end, like some modern suitcases. Furthermore, the cooling system according to the invention may be utilized for larger cooling systems than cooling boxes or bags. It is also possible to utilize waste heat or low temperature energy (below 100° C.) for the regeneration of the sodium sulphide (or its equivalent). In addition hereto the heat generated in the containers or modules 2 and dissipated therefrom may be utilized for heating purposes, e.g. in caravans or house trailers. It is also possible to substitute another chemical, e.g. one in which the positive ions are selected from the group comprising $H^+$, $Li^+$, $Na^+$, and the negative ion is selected from the group comprising $O^{--}$, $S^{--}$, and $Se^{--}$, for at least part of the sodium sulphide. Finally, the water may be replaced e.g. by $NH_3$, $CH_3NH_2$, $CH_3OH$, $C_2H_5OH$ and many other bipolar gases.

What we claim is:

1. Method in the cooling of a space comprising the steps of: forming a vapor from a first substance in a first container located in said space; conducting the vapor thus formed into a second container located outside said space and containing a second substance which chemically absorbs the vapor formed from said first substance for lowering the pressure of said vapor in said second container below the pressure of said vapor formed in said first container; and maintaining the partial pressures of other gases in said first and second containers substantially lower than the vapor pressure of said vapor.

2. The method according to claim 1, wherein said second substance is sodium sulphide.

3. The method according to claim 1, further comprising forming said second substance by introducing it into said second container in the form of a powder and heating said powder to form a substantially rigid, chemically absorbent and porous body.

4. The method according to claim 1, further comprising heating said second substance, when said vapor formed from said first substance is chemically absorbed therein, with low temperature energy for regenerating said second substance.

5. Apparatus for the cooling of a space comprising: a first container located in said space to be cooled and containing a first substance adapted to form a vapor therefrom by absorbing heat from said space; a second container located outside said space, said second container containing a second substance capable of chemically absorbing said vapor for lowering the pressure of said vapor in said second container below the pressure of said vapor in said first container; conduit means for connecting said first container with said second container for allowing the pressure differential of said vapor therebetween to cause said vapor to flow from said first container to said second container; and means for maintaining the partial pressure of other gases in said first and second containers and said conduit means considerably lower than the partial pressure of said vapor formed from said first substance.

6. Apparatus according to claim 5, wherein said second substance comprises sodium sulphide.

7. Apparatus according to claim 5, further comprising heating element means located in said second container for heating said second substance to a temperature below 100° C. to regenerate said second substance.

8. Apparatus according to claim 5, including means for connecting a vacuum pump to said conduit means for reducing the partial pressure of other gases in said first and second containers and said conduit means below the partial pressure of said vapor.

9. Apparatus for the cooling of a space, comprising: a first container located in said space to be cooled and containing a first substance adapted to form a vapor therefrom by absorbing heat from said space; a second container located outside said space to be cooled, said second container containing a second substance which forms a porous, substantially rigid body after being heated in a vacuum by a heat source having a temperature of less than 100° C., which body is capable of chemically absorbing vapor formed from said first substance for causing a lower pressure of said vapor in said second container than in said first container; and conduit means for connecting said first container with said second container to allow the flow of vapor caused by the pressure differential of said vapor therebetween.

10. Apparatus for the cooling of a space as defined in claim 9, wherein said second substance is sodium sulphide.

11. Method of cooling a space, comprising the steps of forming a vapor from a first substance in a first container located in said space by heat absorption by said first substance from said space, conducting the vapor thus formed into a second container located outside said space and containing a second substance, causing said vapor to be chemically absorbed by said second substance for lowering the pressure of said vapor in said second container below the pressure of said vapor in said first container to cause the flow of said vapor therebetween, said second substance forming a porous, substantially rigid, chemically absorbent body in said second container when heated in a vacuum at a temperature of less than 100° C.

12. The method of claim 11, wherein said second substance is sodium sulphide.

* * * * *